Oct. 8, 1968  C. I. BOKSJÖ ETAL  3,405,344
CONVERTER WITH SEMI-CONDUCTOR RECTIFIERS
Filed Oct. 14, 1966

INVENTOR
CARL INGVAR BOKSJÖ
ERICH UHLMANN
BY
Bailey, Stephens & Huettig
ATTORNEYS

United States Patent Office 3,405,344
Patented Oct. 8, 1968

3,405,344
CONVERTER WITH SEMI-CONDUCTOR
RECTIFIERS
Carl Ingvar Boksjö and Erich Uhlmann, Ludvika, Sweden, assignors to Allmänna Svenska Elektriska Aktiebolaget, Vasteras, Sweden, a corporation of Sweden
Filed Oct. 14, 1966, Ser. No. 586,719
Claims priority, application Sweden, Oct. 14, 1965, 13,311/65
8 Claims. (Cl. 321—11)

ABSTRACT OF THE DISCLOSURE

In a static converter for high voltages composed of several branches each containing thyristors connected in series, and with voltage divider means in parallel with the thyristors, the thyristors in each branch are divided into two or more groups, the voltage divider means produce different voltages across the thyristors of the two groups, during the blocking period, and means are provided to cause the thyristors of the group of higher voltage to ignite sooner than those of lower voltage.

---

The present invention relates to a converter for high voltage comprising a rectifier bridge connection where each rectifier branch is built up of a number of series-connected, controlled semi-conductor rectifiers, so-called thyristors.

For converters for high voltage it has recently been proposed to replace mercury-arc rectifiers by series-connected, controlled semi-conductor rectifiers, thyristors, in a number corresponding to the blocking voltages and inverse voltages occurring. In order to obtain suitable voltage distribution during the blocking and inverse intervals for the various rectifier branches, each rectifier branch is parallel-connected to a voltage divider built up of capacitive and resistive elements. An equal voltage distribution between the different rectifiers in a rectifier branch is, however, difficult, not to say impossible, to maintain during the ignition of such a rectifier chain, since absolutely simultaneous ignition of all the rectifiers cannot be achieved. Owing to the fact that some rectifiers ignite earlier than others, with an increasing number of ignited rectifiers in a rectifier branch the voltage will increase across those rectifiers not yet ignited, possibly so much that their safety is jeopardized. In order to some extent to be able to control the situation it has been proposed to predetermine which rectifiers should be ignited last and thus endeavor to protect these against the high voltage arising during the ignition, but since these voltages are extremely high in comparison with the rated voltage of the rectifiers, it may be rather difficult to obtain sufficient protection for the rectifiers.

According to the invention it is proposed to improve the initial state of the last-igniting rectifiers by limiting the voltage across these rectifiers before the ignition. A converter according to the invention will therefore be characterised in that the rectifiers in each rectifier branch are divided into two groups and that each rectifier branch is provided with a voltage-divider so arranged that before the ignition of such a rectifier branch the voltage across each rectifier in one group is higher than the voltage across each rectifier in the other group and that an ignition device for the rectifier branch is arranged in such a way that the rectifiers in the first group are ignited before the rectifiers in the second group.

Figure 1:
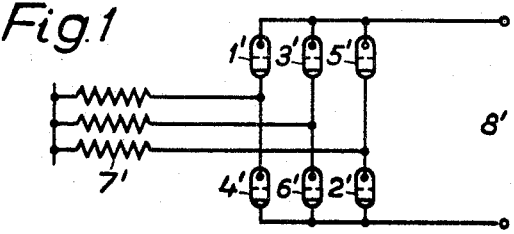

Such an uneven voltage distribution along the rectifier chain can be effected in various ways as is clear from the accompanying drawing where FIGURE 1 simply shows a conventional converter comprising a rectifier bridge having several branches, while FIGURES 2-5 show different embodiments according to the invention of the rectifier branches in such a rectifier bridge.

FIGURE 1 shows a converter in full wave connection and with the pulse number six comprising a rectifier bridge with six mercury-arc rectifiers 1'-6' and a converter-transformer, of which only the rectifier winding 7' has been shown, and direct current outputs 8'. The rectifiers are presumed to be controlled from some known control device, not shown, which emits control pulses with a certain delay angle to the different rectifiers or rectifier branches. During the idle period of each rectifier, the rectifier must first resist the inverse voltage in the inverse direction and, during the last part of the idle period, the commutation voltage arising in the conducting direction, also called the blocking voltage.

Figure 2:
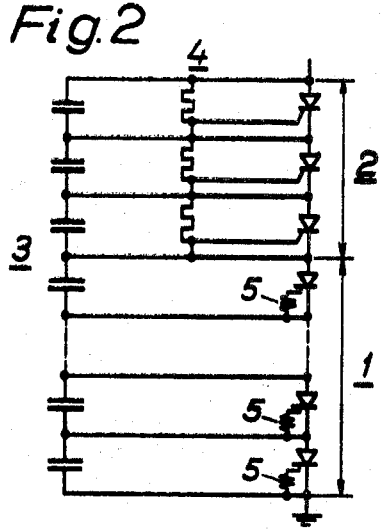

FIGURE 2 shows how a rectifier in FIGURE 1 according to the invention can be replaced by a chain of series-connected semi-conductor rectifiers divided into two groups 1 and 2, parallel-connected with a capacitive voltage divider 3 which provides a suitable distribution of inverse and blocking voltages along the rectifier chain. According to the invention the upper group 2 has also been parallel-connected to a resistive circuit 4 which reduces the voltage across these rectifiers in comparison with the rectifiers in group 1. The rectifier groups 1 and 2 are controlled in such a way that group 1 is ignited first while group 2 only is ignited when group 1 has already ignited. During ignition of group 1, therefore, the voltage across the rectifier chain will become more and more concentrated on rectifier group 2 but, since the initial voltage for group 2 was relatively low, the final voltage for these rectifiers will also be limited. The effect can be further increased if the capacitances of the capacitors parallel-connected with group 2 are chosen higher than those parallel with group 1. In this way the voltage across group 2 produced by the initial blocking voltage will be lower than across group 1 and the voltage across the rectifiers in group 2 caused by discharging of possible leak-capacitances will also be limited.

In the figure the voltage divider 3 has been shown as purely capacitive. Normally, however, it includes both series- and parallel-resistors which, according to the invention, should also be distributed so that the impedances along the entire voltage divider are lower in the upper part than in the lower part.

The latest igniting rectifiers within a group will be subjected to higher voltage than those igniting first. This can to some extent be counteracted by further development of the invention in such a way that within each group the ignition points and voltage divider impedances are adjusted in relation to each other so that the impedance per rectifier decreases with the time delay of the ignition pulse. In this way the transition between the two groups will be more even, perhaps practically continuous so that the rectifier chain can be considered as formed by a large number of groups of rectifiers each containing only a few rectifiers.

In FIGURE 2 individual ignition has been arranged for the rectifiers in group 1, by means of a secondary winding 5 for each rectifier on a common control pulse transformer, not shown, which winding is connected between control electrode and cathode on each rectifier. The rectifiers in group 2, however, have been provided with so-called slave-ignition by connecting their control electrodes to the resistor chain 4. The connection point for the control electrodes has been chosen so that the resistor between electrode and cathode is so small that the blocking voltage across this resistor is not sufficient to ignite the rectifier. When the rectifiers in group 1 ignite, the voltage across the resistor chain 4 increases and therefore also across the electrode-cathode in each thyristor, and these voltages will thus be so high that the rectifiers in group 2 will ignite.

FIGURE 2 shows how the voltages across the rectifiers in group 2 can be limited by using large parallel-connected capacitors, but the permissible size of these is limited by the fact that undamped capacitances might subject the rectifier to impermissibly high energy upon an ignition break-down and also give rise to oscillations owing to transients in the commutation voltage. To avoid this reactors could be inserted in the main circuit corresponding to the anode reactors known from mercury-arc rectifiers, but such reactors are both large and expensive due to great rated and short-circuiting currents. Instead, it is proposed according to the invention to parallel-connect the later-igniting rectifiers with an inductive circuit. For the first-igniting rectifiers, such an inductive circuit operates as if it were connected in the main circuit, but as it is short-circuited by the last-igniting rectifiers it will only be current-carrying for a very short time, so that it can have small dimensions.

Figure 3:
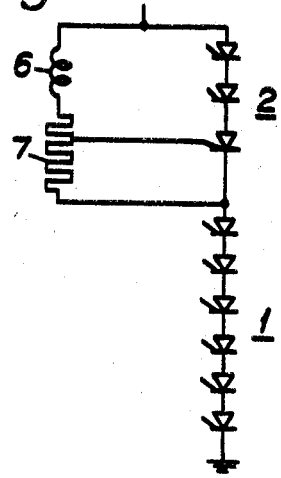

Such a connection has been shown in FIGURE 3 where there are two rectifier groups 1 and 2 in accordance with FIGURE 2 and where the rectifier group 2 is parallel-connected with an inductance 6 in series with a resistor 7. The capacitive voltage divider has not been shown in FIGURE 3. For the rectifiers in group 1 the circuit 6, 7 will act as a damping circuit during the ignition, while for the rectifiers in group 2 it will contribute to limiting the voltage across these rectifiers. Furthermore, it has been shown in FIGURE 3 how at least some of the rectifiers in group 2 can receive their ignition pulses from the resistive part 7 of the damping circuit 6, 7. The ignition pulses to the rectifiers in group 2 can also be delayed until the greatest oscillations in the ignition current have had time to be dampened so that full effect is obtained from the damping influence of the circuit 6, 7.

Figure 4:
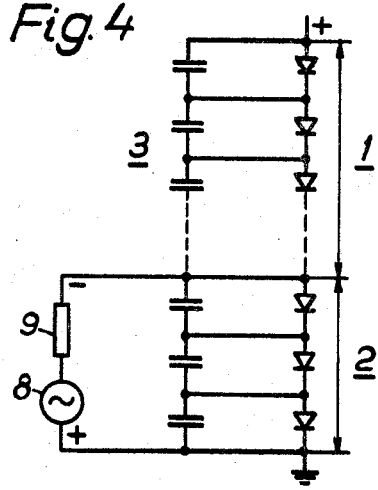
Figure 5:
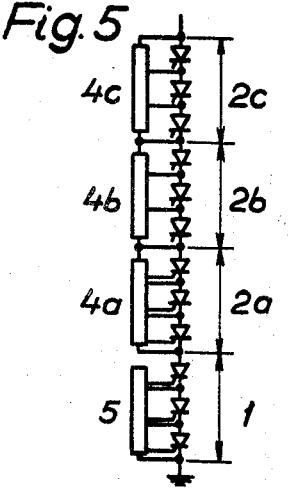

A third possibility for limiting the voltages across a group of rectifiers in a rectifier branch has been shown in FIGURE 4. Also in this figure a chain of series-connected semi-conductor rectifiers has been shown divided into two groups 1 and 2 and parallel-connected with a capacitive voltage divider. A voltage source 8 has been connected in parallel to the last-igniting rectifier group, possibly in series with a resistor 9, which voltage source is counter-connected to the blocking voltage of the rectifier chain. In this way a reduction of the blocking voltage across the rectifier group 2 is obtained. The voltage source 8 may be a direct voltage source, which means that it is formed, for example, as a transformer connected to the AC side of the converter and a rectifier bridge connected thereto. Remembering, however, that according to the invention it is only just before ignition that a reduction of the blocking voltage is necessary, an alternating voltage can be used as the voltage source 8, the phase position of which is such that the desired voltage reduction occurs during the ignition of the rectifier chain 1, 2. In this way the rectifier bridge mentioned can be eliminated. In FIGURE 4 the rectifier group 2 has been arranged nearest the earth potential, whereby the insulation level for the voltage source 8 is limited.

As is clear from the above the result of the basic idea of the invention is dependent upon which ignition principles are used for the various groups of rectifiers. As mentioned, the purpose of the invention is to avoid dangerous over-voltages, particularly in the last-igniting rectifiers and, as possible ignition principles, ignition by means of an outer control device and slave-ignition by means of inner ignition circuits have been mentioned. Besides this it is possible to ignite a thyristor by means of a voltage arising across its anode-cathode, if the positive time derivative of this voltage is sufficiently high. According to this principle it is thus possible to ignite thyristors without any control voltage and with a relatively low voltage across anode-cathode. By a suitable choice of components in the voltage dividers of the rectifier branches it is very simple to pre-determine the time constant of these so that the voltage across certain rectifiers increases with the desired velocity.

Furthermore, thyristors now exist which can withstand igniting at such high voltages that the ignition has the character of a flash-over. Also in this type of ignition no control voltage is supplied to the control electrodes of the thyristors.

Ignition of all rectifiers in a rectifier branch according to FIGURE 2 by means of external ignition impulses would be inconvenient, on the one hand because of the insulation problems involved and on the other hand because the control circuits used would contain large capacitances to earth. Instead it has been shown in FIGURE 2 how group 2 is ignited according to the slave-ignition principle. If, however, the number of slave-ignited rectifiers is great, the ignition process will take an unreasonable time since one rectifier must usually be well conducting before the next can ignite. Of course, by means of the resistive voltage divider 4 in FIGURE 2 it is theoretically possible to obtain simultaneous ignition of all these rectifiers, but since in practice arbitrary unevenness in the voltage distribution between the rectifiers must be expected, the control over the ignition process may be lost.

By utilizing the possibilities of "derivative" ignition and "flash-over" ignition, however, it is possible to achieve a rapid but completely controlled ignition of all the rectifiers in the chain. A rectifier chain according to this principle thus can be formed in accordance with FIGURE 5 where the capacitive voltage divider 3 has been omitted. The thyristors in group 1 are connected by their control electrodes to a common control device, whereas group 2 is divided into three groups, 2a, 2b, and 2c and the resistive voltage divider is divided into three parts 4a, 4b and 4c. The thyristors in group 2a are controlled by means of the slave-ignition principle by connecting their control electrodes to the voltage divider 4a. The thyristors in group 2b are intended to be controlled according to the time derivative principle by a suitable choice of time constants in the voltage divider 4b and the thyristors in group 2c are ignited according to the flash-over principle by suitable choice of the impedance level in the different steps in the voltage divider 4c. The control electrodes in the two last-mentioned groups will therefore not be connected.

Similarly it is possible within each of the main groups 1 and 2 to arrange the different thyristors for ignition according to the different principles mentioned.

Above has been described a number of different embodiments of rectifier chains according to the invention, each of which reduces the voltage stresses on the rectifiers in the chain during ignition and different principles for these. Of course it is necessary in each case by means of calculation and experiments to find out the most favourable conditions by suitable combination of voltage distribution and ignition principles.

We claim:

1. Static converter for high voltage comprising a rectifier bridge connection; said bridge connection comprising a plurality of rectifier branches; each rectifier branch comprising a plurality of series connected, controlled thyristors; voltage divider means connected in parallel with each rectifier branch; traverse connections between equipotential points of said voltage divider means and said rectifier branch; the rectifiers of each rectifier branch being divided into at least two groups; said voltage divider means being so dimensioned that during the blocking period of a rectifier branch the voltage across each rectifier of a first group is higher than the voltage across each rectifier of the second group; ignition means for each, rectifier branch including means to produce ignition of the rectifiers of the first group before the ignition of the rectifiers of the second group.

2. Static converter as claimed in claim 1; said voltage divider means of each rectifier branch comprising a resistive and capacitive voltage divider, the impedance of each part of said voltage divider means corresponding to a rectifier of said first group being greater than the impedance of each part of said voltage divider means corresponding to a rectifier of said second group.

3. Static converter as claimed in claim 2; means to delay, within each of said two groups of rectifiers, the ignition of the rectifiers of such group in relation to each other; the impedance of each part of said voltage divider means being so adapted in relation to the delay of the ignition of the corresponding rectifier that the impedance of such part of the voltage divider means decreases with increasing delay of the ignition of the corresponding rectifier.

4. Static converter as claimed in claim 2; an inductive circuit connected in parallel to said second group of rectifiers.

5. Static converter as claimed in claim 2 parts of said voltage divider means corresponding to certain of said rectifiers being dimensioned with such time constants that the positive time derivative of the voltage across each of said parts during ignition of the respective rectifier branch exceeds the flash-over time derivative of the voltage across the corresponding rectifier.

6. Static converter as claimed in claim 2; parts of said voltage divider means corresponding to certain of said rectifiers having such great impedance that the voltage across each of said parts during ignition of the respective rectifier branch exceeds the flash-over anode to cathode voltage of the corresponding rectifier.

7. Static converter as claimed in claim 1; a voltage source for each rectifier branch; said voltage source being connected in parallel to said second group of rectifiers; said voltage source being counterdirected to the blocked voltage across said second group of rectifiers.

8. Static converter as claimed in claim 1; said ignition means for said first group being main ignition means controlled from outside; said ignition means for said second group being slave ignition means.

References Cited

UNITED STATES PATENTS

| | | | |
|---|---|---|---|
| 3,122,695 | 2/1964 | Meissen | 321—27 X |
| 3,226,625 | 12/1965 | Diebold | 321—27 |
| 3,267,290 | 8/1966 | Diebold | 307—88.5 |

FOREIGN PATENTS 1,156,165  10/1963  Germany.

OTHER REFERENCES

General Electric silicon controlled rectifier manual, third edition, "Series and Parallel Operation of SCR's," pp. 91–98.

JOHN F. COUCH, *Primary Examiner.*

W. H. BEHA, *Assistant Examiner.*